United States Patent [19]

Aoki

[11] Patent Number: 4,888,511
[45] Date of Patent: Dec. 19, 1989

[54] MOTOR

[75] Inventor: Kanemasa Aoki, Yokohama, Japan

[73] Assignees: Canon Kabushiki Kaisha; Canon Seiki Kabushiki Kaisha, both of Tokyo, Japan

[21] Appl. No.: 217,867

[22] Filed: Jul. 12, 1988

[30] Foreign Application Priority Data

Jul. 21, 1987 [JP] Japan ................................ 62-181705

[51] Int. Cl.⁴ ........................................... H02K 13/04
[52] U.S. Cl. ...................................... 310/237; 310/43; 310/71; 310/91; 310/154; 310/264
[58] Field of Search ............... 310/268, 154, 237, 233, 310/43, 90, 42, 91, 68 R, 46, 71, 72, 89, 139, 248, 40 MM, 220, 221, 198, 261, 264, 267

[56] References Cited

U.S. PATENT DOCUMENTS

| | | | |
|---|---|---|---|
| 3,322,988 | 5/1967 | Ishikawa | 310/220 |
| 4,037,125 | 7/1977 | Aoki | 310/248 |
| 4,080,544 | 3/1978 | Aoki | 310/268 |
| 4,086,510 | 4/1978 | Watanabe | 310/90 |
| 4,088,914 | 5/1978 | Aoki | 310/90 |
| 4,237,394 | 12/1980 | Aoki | 310/113 |
| 4,259,604 | 3/1981 | Aoki | 310/113 |
| 4,327,304 | 4/1982 | Aoki | 310/266 |
| 4,349,761 | 9/1982 | Aoki | 310/154 |
| 4,494,026 | 1/1985 | Abe | 310/40 MM |
| 4,532,449 | 6/1985 | Aoki | 310/198 |
| 4,769,566 | 9/1988 | Matsuda | 310/40 MM |

FOREIGN PATENT DOCUMENTS

| | | | |
|---|---|---|---|
| 47-25805 | 11/1972 | Japan . | |
| 52-35804 | 3/1977 | Japan . | |
| 58-159888 | 10/1983 | Japan . | |
| 59-95750 | 6/1984 | Japan . | |
| 2177854 | 1/1987 | United Kingdom | 310/220 |
| 2194392 | 3/1988 | United Kingdom | 310/40 MM |

Primary Examiner—R. Skudy
Attorney, Agent, or Firm—Fitzpatrick, Cella, Harper & Scinto

[57] ABSTRACT

An electric motor which achieves reduced axial height by an arrangement of a motor case which mounts an outer field magnet and which also rotatably supports a motor shaft. A cup shaped yoke fixed to the shaft supports a rotor core and coil. A commutator is mounted on the yoke and is contacted by brushes fixed to a resin member embedded in an aperture formed in the motor case.

3 Claims, 4 Drawing Sheets

MOTOR

BACKGROUND OF THE INVENTION

1. Field of the Invention

The present invention relates to a motor, and more particularly to the structure of a Electric Motor With Reduced Axial Height in which current supply to armature coils is achieved through current feeding means consisting of a commutator and brushes.

2. Related Background Art

A conventional motor structure disclosed in the U.S. Pat. No. 4,532,449 is composed of an other tubular case, a motor cover member mounted on the opposite end of said tubular case, and brushes and brush support members fixed on the inner face of the motor cover member. The above-mentioned motor structure has been associated with a drawback of a large axial height when the motor is mounted on a base plate of the electric appliance.

SUMMARY OF THE INVENTION

The present invention is to reduce the axial dimension required for the positioning of current feeding member and thus to increase the ratio of the motor diameter to the motor height, by mounting a magnet around a motor case supporting a rotary shaft, fixing a core member on which field coils are wound, on said rotary shaft through a yoke member, forming an aperture in said motor case, and embedding a resin member supporting the current supply members in said aperture.

Said current supply members include elastic brushes and terminals for supporting said brushes and for receiving current supply from the exterior wherein an end of said terminal is extended to the outside of the motor case, whereby the above-mentioned structure contributes to the formation of a flatting motor.

BRIEF DESCRIPTION OF THE DRAWINGS

FIGS. 4 to 7 illustrate another embodiment of the present invention, wherein;

FIG. 4 is an axial cross-sectional view of a principal part;

FIG. 5 is a plan view of a motor case seen in a direction A1-A2 in FIG. 4;

FIG. 6 is a schematic view of a mold for embedding resin in the aperture of the motor case; and FIG. 7 is a cross-sectional view of the motor case.

DETAILED DESCRIPTION OF THE PREFERRED EMBODIMENT

Figure 1:
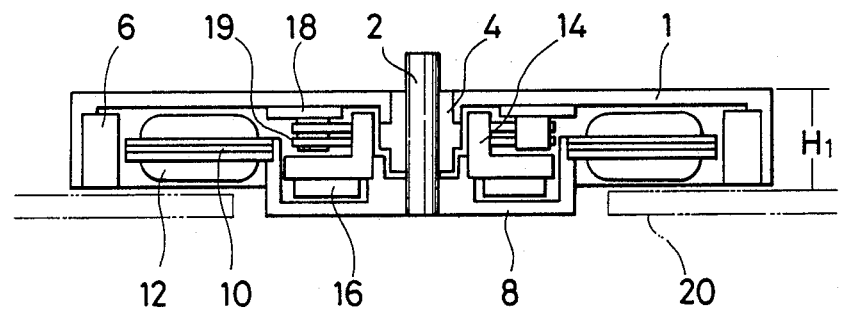
FIG. 1 is a longitudinal cross-sectional view of a commutator motor constituting a first embodiment of the present invention.
Figure 2:
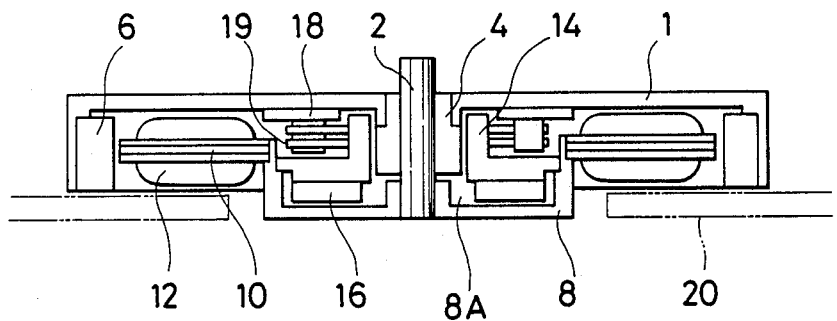
FIG. 2 is a longitudinal cross-sectional view of a commutator motor constituting a second embodiment of the present invention.
Figure 3:
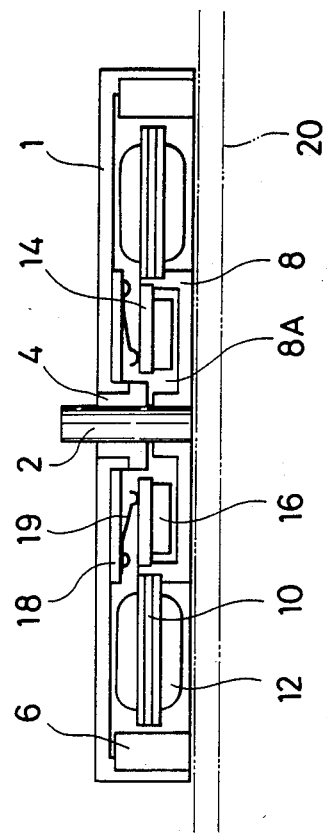
FIG. 3 is a longtiduinal cross-sectional view of a commutator motor constituting a third embodiment of the present invention.

Now the present invention will be clarified in detail by embodiment shown in FIGS. 1 to 3.

FIG. 1 is a longitudinal cross-sectional view of a commutator motor constituting a first embodiment of the present invention.

In FIG. 1, in the center of the bottom of an outer tubular case 1, a metal bearing 4 for supporting a motor shaft 2 is fixed for example by pressing, and field magnets 6 are fixed on the internal periphery of said tubular case 1.

On the motor shaft 2, a cup-shaped yoke 8 is fixed for example by pressing, and a grooved core 10 and coils 12 are mounted on the outer periphery of said yoke 8.

Also a commutator 14 is fixed on said cup-shaped yoke 8, in a portion thereof extending around said metal bearing 4.

Said cup-shaped yoke 8, grooved core 10 and coils 12 constitute a rotary armature, which is rotatably supported by the motor shaft 2.

Said commutator 14 is fixed to said armature.

To said commutator 14 there is connected a spark quenching element 16 composed for example of a capacitor.

Around the metal bearing 4 in the case 1, there is mounted a brush supports member 18, which support brushes 19 in sliding contact with conductors of said commutator 14.

In this manner there is dispensed with an end cover which has conventionally been required for supporting the brushes.

The embodiment shown in FIG. 1, in which the end cover is dispensed with by the use of the brush support member 18 around the metal bearing 4 in the case 1, reduces the motor height H1 when the motor is mounted on a base plate 20, by the thickness of said end cover, in comparison with the height of the conventional motor. In this manner it is rendered possible to realize a flattened motor.

Besides, as will be apparent from FIG. 1, the motor shaft 2 can be supported at the lower end thereof by another member such as a support member, so that the fixing or keying of a pulley or a gear on said motor shaft 2 can be achieved easily and securely.

The cup-shaped yoke 8 often protrudes somewhat from the motor height H1 as shown in FIG. 1, but the amount of said protrusion an be usually absorbed in the thickness of the base plate 20 and does not increase the motor height H1.

FIG. 2 is a longitudinal cross-sectional view of a commutator motor constituting a second embodiment of the present invention.

In the present embodiment, the communtator 14 is supported, not at the center but at the external periphery, by the cup-shaped yoke 8, and the surface of the metal bearing 4 extends to an internal space 8A of the lower cup-shaped yoke 8.

Except for the above-explained points, the structure of the present embodiment is same as that shown in FIG. 1. The components of FIG. 2, which are the same as those in FIG. 1 are represented by same numbers and will not be explained further.

The embodiment shown in FIG. 2 can provide the same advantages as provided in the embodiment shown in FIG. 1. In addition, the commutator 14 is fixed at the external periphery to the cup-shaped yoke 8 and the surface of the metal bearing 4 is extended to the internal space 8A of the cup-shaped yoke 8 positioned below as explained above, so that the oil from the metal bearing 4 when it is an oil-containing metal can be discharged below. In this manner it is possible to prevent oil penetration to the sliding surface between the commutator 14 and the brushes 19, eventually causing defective current conduction.

FIG. 3 is a longitudianl cross-sectional view of a commutator motor constituting a third embodiment of the present invention.

In the present embodiment, the commutator 14, which is fixed at its external periphery to the cup-shaped yoke 8, is composed of a thin flat disk-shaped conductor, and the brushes 19, together with the brush support member 18, are mounted on the internal bottom face of the tubular case 1.

Except for the above-explained points, the third embodiment shown in FIG. 3 is substantially same as the second embodiment shown in FIG. 2; and components which are the same as those shown in FIG. 2 are represented by same numbers and will not be explained further.

The embodiment shown in FIG. 3 has the same advantages as in the second embodiment shown in FIG. 2. Besides, the use of a thin flat conductor as the commutator 14 further reduces the height of the internal structure of the motor, thereby eliminating the protruding portion of the cup-shaped yoke 8 without altering the motor height and thereby achieving a flattened motor structure.

FIGS. 4 to 7 illustrate another embodiment of the present invention.

Figure 4:
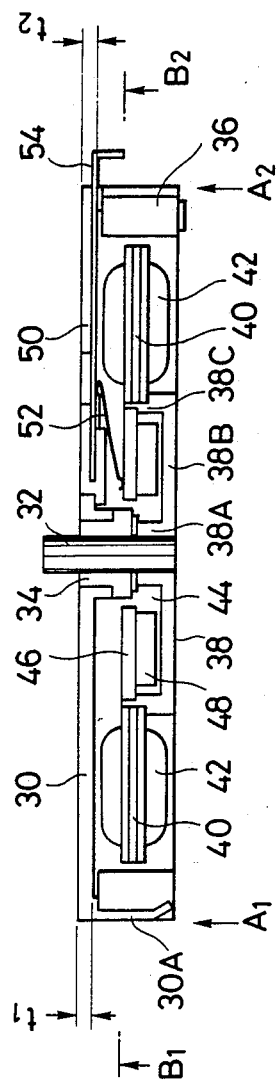

FIG. 4 is a cross-sectional view of the principal part of the motor of said embodiment, wherein a motor case 30 is provided with a tubular part 30A at the external periphery and, at the central portion thereof, with a hole for accepting a bearing 34 for supporting a rotary shaft 32.

A ring-shaped permanent magnet 36 is fixed at the inside of the tubular part 30A of the motor case 30.

A yoke member 38 is composed of a yoke portion 38B, an external tubular portion 38C, and an internal tubular portion 38A to be fitted on said rotary shaft 32. On said external tubular portion 38B there is fixed a laminated iron core 40 on which armature coils 42 are wound. A commutator support member 46 is fixed on a recess 44 between said external tubular portion 38C and said internal tubular portion 38A, and supports divided segments (not shown) on a ring-shaped insulating substrate.

A spark quenching element 48 is mounted on the support member 46.

Figure 6:
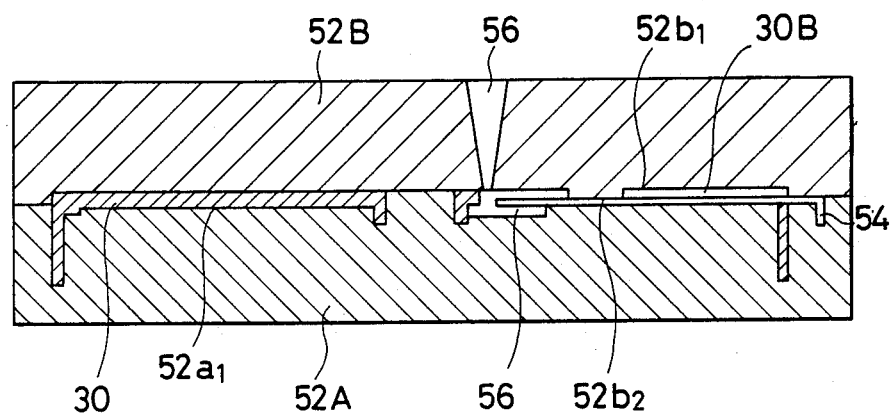

A resin member 50, for supporting brushes 52 and brush supporting terminals 54, is molded in an aperture 30B of the motor case 30, by means of a mold shown in FIG. 6. As shown in FIG. 4, the brushes 52 press down on the commutator support member 46; and since, as stated above, the divided segments are supported on the commutator support member, the brushes 52 contact and transfer current to the commutator segments, thereby providing electrical energization of the rotor coils in the usual manner.

Figure 5:
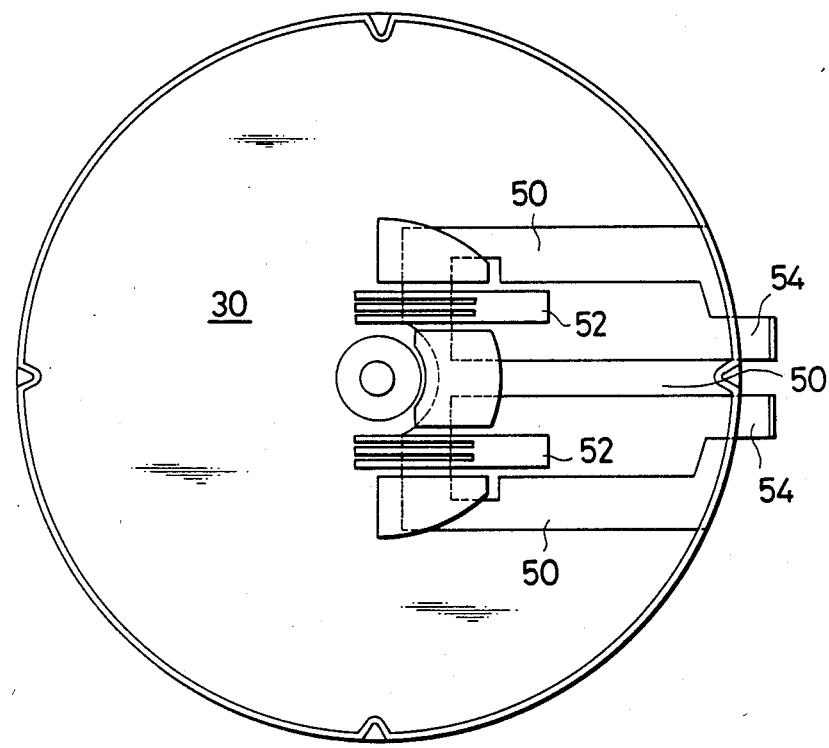

FIG. 5 is a plan view of the motor case seen in a direction A1–A2 in FIG. 4.

In FIG. 6, an upper mold 52A and a lower mold 52B constitute a mold for forming the resin member.

The mutually opposed faces $52a_1$, $52b_1$ of the upper and lower molds 52A, 52B are provided with a recess for accommodating said motor case 30 and a recess for accommodating said brush support member 54.

A pressing portion $52b_2$ protrudes from said face $52b_1$ for pressing the brush support member 54 against the lower mold.

When the upper and lower molds shown in FIG. 6 are mutually closed with the motor case 30 and the brush support member 54 therein, there are formed a space 30B corresponding to the aperture of the case 30 and a space 56 formed defined by the lower mold and the brush support member 54, and these spaces 30B, 56 constitute cavities for resin injection.

Said spaces 30B, 56 are filled by injection of molten resin from a resin injecting gate 56 shown in FIG. 6.

Figure 7:
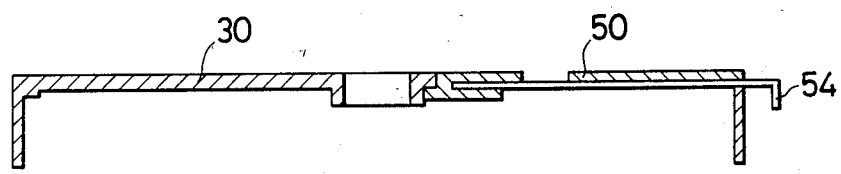

FIG. 7 is a cross-sectional view of the motor case 30 removed from the mold after cooling of resin, wherein resin 50 is filled in the aperture of the motor case 30 and supports the brush support member 54. After the motor case 30 is removed from the mold, brushes 52, 52 shown in FIG. 5 are fixed, for example by caulking on the upper face of the support member 54.

The bearing 34 and the rotary shaft 32 shown in FIG. 4 are mounted on the motor case prepared as explained above in relation to FIGS. 5 to 7. Then the yoke member 38, core 40 and coils 42 constituting the rotor of the motor are mounted, and the ring-shaped permanent magnet 36 is inserted along the external periphery of the motor case. After adjustment of the relative position of the brushes and the permanent magnet, said permanent magnet is fixed to the motor case for example by caulking or adhesion. The brush 52 employed in the present embodiment is divided into plural fine strips at an end, and is provided, at the other end, with a bent portion for fixing on the brush support member 54. In this manner the brush height is reduced, and the contact with the contact face of the ring-shaped commutator is ensured.

As will be apparent from the foregoing explanation, the present invention is featured, in a motor in which the field magnet is mounted on the internal periphery of an external tubular case and a bearing is mounted at the center of the bottom of said case, by mounting a brush support member around said bearing on said bottom of the case and dispensing with the end cover, thereby correspondingly reducing the thickness of the motor.

The above-explained structure is also advantageous in improving the work efficiency and preventing the defects in fixing a pulley or a gear on the motor shaft.

Also the present invention is featured by forming an aperture in the motor case and filling said aperture with a resin member for supporting a brush support member and brushes, thereby reducing the ratio of the motor height to the motor diameter and providing a flattened motor.

Furthermore the present invention is featured by forming a recess 44 between the internal position 38A and external portion 38C of the yoke member 38 and positioning a commutator support member 46 in said recess, and positioning the core and coils 42 in the same plane of said commutator support member 46 (plane B1–B2 in FIG. 4), thereby reducing the axial height of the motor.

What is claimed is:

1. A motor comprising:
   a motor case having a bearing rotatably supporting a rotary shaft, and formed with a cylindrical portion at an external periphery portion of the motor case;
   a field magnet attached to and inside of said cylindrical portion of the motor case;
   a cup-shaped yoke member fixed to said rotary shaft;
   an iron core fixed to an external periphery of said cup-shaped yoke member;
   a coil wound around said iron core;
   a commutator having divided commutator portions on a plane, said commutator portions being mounted and fixed to said cup-shaped yoke member inside said external periphery portion, and connected to said coil; and current supply means having brushes in contact with said commutator portions and terminals for supplying current to said brushes, said terminals being fixed to a resin member embedded in an aperture formed on said motor.

2. A motor according to claim 1, wherein said resin member fills the aperture of said motor case, thus constituting a part of said motor case.

3. A motor comprising:

a motor case having a bearing rotatably supporting a rotary shaft, and formed with a cylindrical portion at an external periphery portion of the motor case;

a field magnet attached to and inside of said cylindrical portion of the motor case;

a cup-shaped yoke member fixed to said rotary shaft;

an iron core around which a coil is wound, mounted and fixed between said yoke member and said field magnet on said external periphery portion of said yoke member, said coil being exposed from a structural portion of said motor;

a commutator; and brushes;

wherein said commutator is held by said cup-shaped yoke member, and slidingly abuts said brushes held by brush holding members, said commutator being spaced from said bearing to provide communication to an inner space of said cup-shaped yoke member.

* * * * *

UNITED STATES PATENT AND TRADEMARK OFFICE
CERTIFICATE OF CORRECTION

PATENT NO. : 4,888,511
DATED : December 19, 1989
INVENTOR(S) : KANEMASA AOKI

Page 1 of 2

It is certified that error appears in the above-identified patent and that said Letters Patent is hereby corrected as shown below: ON TITLE PAGE:

AT [30] Foreign Application Priority Data

--Jun. 24, 1988 [JP] Japan.................63-84347--
should be inserted.

AT [57] ABSTRACT

Line 4, "cup shaped" should read --cup-shaped--.

COLUMN 1

Line 7, "Electric Motor With" should read --motor--.
Line 8, "Reduced Axial Height" should be deleted.
Line 37, "flatting" should read --flattened--.
Line 46, "longtiduinal" should read --longitudinal--.
Line 50, "wherein;" should read --wherein:--.
Line 62, "embodiment" should read --the embodiments--.
Line 32, "said" should read --such --.

COLUMN 2

Line 18, "supports" should read --support-- and
"support" should read --supports--.
Line 40, "an" should read --can--.
Line 46, "communtator 14" should read --commutator 14--.
Line 62, "the oil" should read --oil--.

COLUMN 3

Line 1, "longitudianl" should read --longitudinal--.
Line 37, "external tubular portion 38B" should read
--external tubular portion 38C--.

UNITED STATES PATENT AND TRADEMARK OFFICE
CERTIFICATE OF CORRECTION

PATENT NO.   : 4,888,511
DATED        : December 19, 1989
INVENTOR(S)  : KANEMASA AOKI Page 2 of 2

It is certified that error appears in the above-identified patent and that said Letters Patent is hereby corrected as shown below:

<u>COLUMN 4</u>

Line 48, "internal position 38A" should read
           --internal portion 38A--.

Signed and Sealed this

Second Day of June, 1992

*Attest:*

DOUGLAS B. COMER

*Attesting Officer*     Acting Commissioner of Patents and Trademarks